United States Patent Office 3,790,593
Patented Feb. 5, 1974

3,790,593
**1-SUBSTITUTED-5-NITROIMIDAZOL-2-YLALKYL-
(N-SUBSTITUTED)-CARBAMATES**
John A. Carlson, Mead Road, R.F.D. 2, Nassau, N.Y.
12123; Dale R. Hoff, 2 Kings Ridge Road, R.F.D. 1,
Basking Ridge, N.J. 07920; and Clarence S. Rooney,
416 Fletchers Road, Beaconsfield, Quebec, Canada
No Drawing. Application Sept. 5, 1969, Ser. No. 855,765,
now Patent No. 3,646,027, dated Feb. 29, 1972, which
is a continuation-in-part of application Ser. No. 550,932,
May 18, 1966, which in turn is a continuation-in-part
of application Ser. No. 470,239, July 7, 1965, both
now abandoned. Divided and this application Nov.
12, 1971, Ser. No. 198,440
Int. Cl. C07d 49/36
U.S. Cl. 260—309          8 Claims

ABSTRACT OF THE DISCLOSURE 1-substituted-5-nitroimidazol-2-ylalkyl carbamates containing N-amino or N-substituted amino substituents, and acid addition salts thereof are prepared from 1-substituted-5-nitroimidazoles having at the 2-position of the imidazole ring an hydroxyalkyl, mercaptoalkyl, haloalkyl, halocarbonylalkyl or halothiocarbonyloxyalkyl radical. The 1 - substituted-5-nitroimidazol-2-ylalkyl-(N-substituted)-carbamates are useful in the treatment of parasitic diseases. Antiparasitic compositions in which the active ingredient is a 1-substituted imidazol-2-ylalkyl-(N-substituted)-carbamate are also provided.

CROSS REFERENCE TO RELATED APPLICATIONS

This application is a divisional application of our copending application U.S. Ser. No. 855,765, filed Sept. 5, 1969, now U.S. 3,646,027, which was a continuation-in-part application of copending U.S. Ser. No. 550,932, filed May 18, 1966, now abandoned, which in turn, was a continuation-in-part application of U.S. Ser. No. 470,239, filed July 7, 1965, and now abandoned.

DESCRIPTION OF THE PREFERRED EMBODIMENTS

This invention relates to new chemical compounds. More particularly, it relates to novel imidazole carbamates. It is concerned further with chemical synthesis of such substances and with novel imidazole compounds useful as intermediates in such synthesis. In addition, it is concerned with antiparasitic compositions containing the imidazole carbamates of this invention as active ingredients.

One object of this invention is to provide new and useful 1-substituted-imidazol-2-ylalkyl, N - substituted carbamates and acid addition salts thereof. It is also an object to provide 1-substituted-5-nitroimidazol-2-ylalkyl-(N-substituted)-carbamates which have antiparasitic activity. Another object is to provide methods for making these compounds from 1-substituted-5-nitroimidazoles having at the 2-position of the imidazole ring, a hydroxyalkyl, mercaptoalkyl, haloalkyl, halocarbonyloxyalkyl, or halothiocarbonyloxyalkyl radical.

A further object is to provide compositions useful against parasitic diseases, for example, trichomoniasis, enterohepatitis and as antihelminthic compositions against ascarids and schistosomes. Certain of them are also effective against amoebiasis and trypanosomiasis as well as chronic respiratory diseases in fowl and swine caused by PPLO organisms. Certain of the compositions of the present invention also show antibacterial activity. In these compositions, 1-substituted-5-nitroimidazol-2-yl-alkyl-(N-substituted)-carbamates are present as active ingredients.

The novel imidazole carbamates of this invention may be represented by the following structural formula:

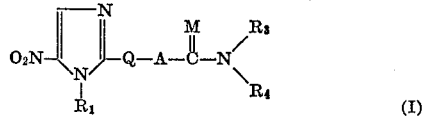

in which $R_1$ is loweralkyl having 1–5 carbon atoms, Q is loweralkylene or loweralkylidene having 1–4 carbon atoms, A and M are each oxygen or sulfur, $R_3$ is hydrogen, loweralkyl having 1–3 carbon atoms or benzyl, and $R_4$ is amino or substituted amino, wherein the preferred substituents are carbamoyl and thiocarbamoyl; alkylidene, such as loweralkylidene, isopropylidene, 2-butylidene, 3-pentylidene, and ethylidene; aralkylidene, for example, phenylloweralkylidene, such as benzylidene; acyl, for example, alkanoyl, suitably loweralkanoyl, such as, formyl, acetyl, propionyl, butyryl, or valeryl; aralkanoyl, suitably phenylloweralkanoyl, such as phenylbutyryl; cyanoalkanoyl, suitably cyanoloweralkanoyl, such as cyanoacetyl or cyanopropionyl; alkenoyl, suitably loweralkenoyl, such as, acryloyl or crotonoyl; and aroyl, such as benzoyl.

Also within the purview of the invention are acid addition salts of these imidazole carbamates. The salt may be of an inorganic acid such as the hydrochloride, hydrobromide, phosphate, nitrate or sulfate, or of an organic acid, examples of which are the citrate, tartrate, adipate, methanesulfonate, p-toluenesulfonate and the like. Nontoxic acid addition salts, i.e., those tolerated by the host at the dose levels employed, are employed when the carbamates are to be used in their salt form as antiparasitic agents.

The preferred compounds of this invention are the 1-substituted-5-nitroimidazol-2-ylalkyl N-aminocarbamates. More specifically, the preferred compounds are the imidazolylalkyl carbamates of the invention as shown in Formula I supra, wherein Q is loweralkylene suitably methylene or ethylene, or loweralkylidene suitably 1-ethylidene, $R_1$ is alkyl such as methyl or ethyl, and the sub-group

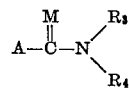

wherein A is oxygen or sulfur, M is oxygen or sulfur and $R_3$ is hydrogen and $R_4$ is amino, loweralkylideneamino, or loweralkanoylamino. These preferred embodiments will be discussed at more length than others in the description of the invention. The following explanations of processes apply to most substances embraced by the generic Formula I.

In accordance with the present invention, there are provided chemical syntheses of these novel imidazolylalkyl carbamates.

THE GENERAL PROCESSES (i) The imidazole halocarbonate process

One process for making the carbamates of this invention consists in reaction of the halocarbonate or halothioncarbonate ester of 1-substituted-2-hydroxyalkyl-(or 2-mercaptoalkyl)-5-nitroimidazole with a primary or secondary amine. The reaction may be schematically represented as follows:

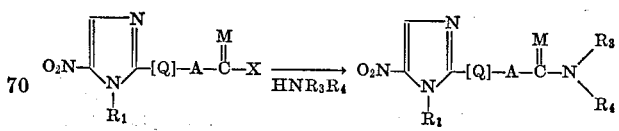

wherein Q, A, M, $R_1$, $R_3$, and $R_4$ are as above, and X is halo.

In the preferred modification of this process, the significance of the substituents is as follows:

Q is loweralkylene suitably methylene or ethylene; or loweralkylidene suitably ethylidene;

$R_1$ is loweralkyl suitably methyl, ethyl or propyl;

A and M each represent oxygen or sulfur;

X is chloro;

$R_3$ is hydrogen and $R_4$ is amino.

The two reactants are contacted in a suitable inert solvent medium such as dioxane, tetrahydrofuran or an aromatic hydrocarbon, such as benzene, at a temperature in the range of about 0–75° C. An excess of amine reactant is generally employed and good results are obtained with from about 2.0–5.0 moles of amine per mole of halocarbonate ester, such as chlorocarbonate ester, at reaction temperatures of from about 10–40° C. for most amines. It might be noted that the ester reactants are frequently referred to by those in this art as the haloformate (or halothionformate) esters of the 1-substituted-2-hydroxyalkyl (or mercaptoalkyl)-5-nitroimidazole.

The molar excess of amine is desired since it is convenient and customary to use 1 mole of the amine (in addition to the mole needed for the reaction itself) as an acid binding agent to neutralize the acid formed in the reaction. The reactants are more commonly termed "hydrazines." The haloformate ester starting material may be charged to the reaction in the form of an acid addition salt, and it is then necessary to have another mole of amine to neutralize this salt.

Amines which are suitable for use in this reaction include hydrazine, methylhydrazine, ethylhydrazine, benzylhydrazine, and the like.

(ii) Preparation of imidazole halocarbonate

The imidazole chlorocarbonate or chlorothioncarbonate ester used in the above process is obtained by reacting phosgene or thiophosgene at a temperature of between about −10° C. and room temperature with an imidazole of the structure

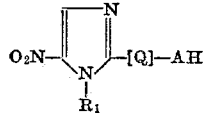

where Q, A, and $R_1$ are as above. Generally the lower temperatures are used with phosgene, and higher temperatures with thiophosgene. The process is conducted in an inert organic solvent medium. Satisfactory solvents are dioxane, tetrahydrofuran and toluene, or mixtures thereof, as well as ketones and esters such as ethyl acetate. It is desirable to employ a solvent in which the imidazole reactant is essentially completely soluble. For best results, the process is conducted in the presence of an acid binding agent, normally a tertiary amine such as trialkylamine or dimethylaniline, although solvents such as tetrahydrofuran and dioxane may themselves be used as acid binding agents in this reaction. The chloroformate or chlorothionformate ester may be isolated, if desired, but this is unnecessary, and it is a preferred embodiment of the invention to prepare the ester in solution and to react it without isolation with the amine.

(iii) The phenyl halocarbonate method

Still another process which is very useful for preparing the novel imidazolylalkyl carbamates described herein comprises the conversion of a 1-substituted-2-hydroxyalkyl (or mercaptoalkyl) imidazole to a phenyl carbonate or phenyl thioncarbonate derivative, and subsequent treatment of said carbonate or thioncarbonate with an amine, as illustrated below:

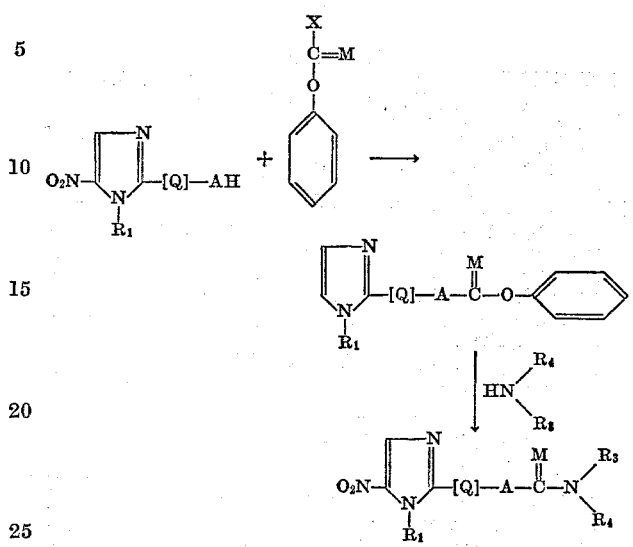

wherein Q, $R_1$, $R_3$, $R_4$, A and M are as above and X is halo.

This process for making imidazolylalkyl carbamates, which process is itself not a part of this invention, but is rather an invention of our colleague George Gal, is highly satisfactory for obtaining carbamates. This process is described more fully in U.S. Pat. 3,458,528, issued July 29, 1969.

In the preferred modification of this process, the significance of the substituents is as follows:

Q is loweralkylene subitably methylene or ethylene; or loweralkylidene suitably 1-ethylidene;

$R_1$ is loweralkyl suitably methyl, ethyl or propyl;

A and M each represent oxygen or sulfur;

$R_3$ is hydrogen and $R_4$ is amino.

In carrying out this process, a 1-loweralkyl-2-hydroxyalkyl (or mercaptoalkyl)-5-nitroimidazole such as 1-methyl-2-hydroxyalkyl (or mercaptoalkyl)-5-nitroimidazole such as is first reacted for example with phenoxy carbonyl chloride (phenyl chloroformate) or phenoxythiocarbonyl chloride (phenyl thionchloroformate). This reaction is conveniently brought about in an organic solvent, such as pyridine, one of the picolines, or lutidine. These bases, in addition to serving as the liquid solvent medium, also serve to bind the acid formed during the reaction. Alternatively, a non-basic solvent for the reactants such as dioxane or chloroform may be employed, and sufficient tertiary amine or alkali metal hydroxide added to bind the liberated hydrogen chloride. It is preferred to employ a slight molar excess of phenyl chloroformate reactant and to carry out the process at temperatures of from about −5° C. to about 45° C. Preferably, the reactants are mixed at about 0° C. and the reaction then continued at about room temperature for the desired time. When a phenyl carbonate of a 2-hydroymethyl or 2-mercaptomethyl is being prepared, reaction times of from about 1–5 hours are satisfactory for good results. However, longer times of up to about 30 hours may be necessary for complete reaction in the case of 2-(α - hydroxyethyl) and 2-(α - mercaptoethyl)imidazoles. The resulting imidazole phenyl carbonate, such as for instance 1-methyl-5-nitroimidazol-2-ylmethyl phenyl carbonate or 1-methyl - 5 - nitroimidazol-2-ylmethyl phenyl thioncarbonate is conveniently recovered by quenching the reaction mixture in ice water, thus precipitating the desired product. These substances may be used without further purification in the next step of the process, and this is preferred in the case of the phenyl thioncarbonates which are less stable than the phenyl carbonates.

The imidazolylalkyl carbamate is then obtained by intimately contacting the imidazole phenyl carbonate or phenyl thioncarbonate with an amine in an inert organic solvent medium. For this purpose, chloroform or ethers such as dioxane, tetrahydrofuran or ethylene glycol dimethyl ether are satisfactory. It will, of course, be understood that the particular carbamate produced will depend upon the amine reactant used. The reaction is a rapid one and is normally substantially complete in about 1–5 hours. The imidazole phenyl carbonate and the amine may be reacted in essentially equimolar amounts although it is preferred to employ an excess of the amine. Good results are obtained by using from 1.0–4 moles of amine per mole of phenyl carbonate.

5-nitroimidazol-2-ylalkyl $N^2$-alkylidenecarbazates 5-nitroimidazol-2-ylalkyl $N^2$-alkylidenecarbazates may be produced by reacting a 5-nitroimidazol-2-ylalkyl carbazate with a carbonyl compound. In the preferred modification of the procedure, a 1-$R_1$-5-nitroimidazol-2-ylmethyl carbazate such as 1-methyl-5-nitroimidazol-2-ylmethyl carbazate, is allowed to react (with or without a solvent) with an excess of carbonyl compound suitably an aldehyde or ketone, for example, benzaldehyde, acetone, methylethylketone or acetophenone, and heated under reflux, for example, at a temperature of between 40° C. and 120° C. for a period of from 5 to 30 minutes. The product is then isolated, suitably the solvent is removed under reduced pressure and the product recrystallized from the residue.

Included among the compounds which may be produced in accordance with this procedure are: 1-methyl-5-nitroimidazol-2-ylmethyl $N^2$-butylidenecarbazate, 1-ethyl-5-nitroimidazol - 2 - ylmethyl $N^2$-benzylidenecarbazate, and 1-(1'-(2''-hydroxyethyl)-5'-nitroimidazol-2'-yl)ethyl $N^2$-isopropylidenecarbazate.

Other derivatives of the carbazates can be prepared in analogous fashion by using an acyl halide or acid anhydride as reactant in place of the aldehyde or ketone above.

The 1-substituted - 2 - imidazolylalkyl-(N-substituted)-carbamates above have antiprotozoal activity, and are particularly active against the causative organisms of the protozoal parasitic diseases trichomoniasis and enterohepatitis. Certain of them are also effective against amoebiasis and trypanosomiasis, as well as against the PPLO organisms and schistosomes. It will, of course, be understood that the compounds differ in their degree of efficacy against these various organisms.

Trichomoniasis is a protozoan disease caused by parasites of the genus Trichomonas. The compounds of the invention are effective against the particularly troublesome form of trichomoniasis known as *T. vaginalis vaginitis*, caused by infestation of the vagina with *T. vaginalis*. In treating this disease, the imidazolylalkyl carbamates may be administered either orally or topically. For oral administration unit dosage, forms such as tablets or capsules are normally employed which may contain from about 50 to about 500 mg. of aceive ingredient. These are prepared by techniques known in the art, and contain the usual diluents, granulating agents, extenders and/or lubricating agents known to be satisfactory for the compounding of tablets and capsules. It is preferred to administer the compounds of the invention orally at a dose level of from about 25–1,000 mg./day, in either single or divided doses with divided doses being used more frequently than a single daily dose. An example of a suitable compressed tablet is the following:

| Component: | Mg. per tablet |
| --- | --- |
| 1-methyl-5-nitroimidazol-2-ylmethyl carbazate | 250 |
| Dicalcium phosphate | 100 |
| Lactose | 75 |
| Starch | 50 |
| Guar gum | 12 |
| Magnesium stearate | 2–3 |

If desired, tablets may be sugar coated or enteric coated by standard techniques. Alternatively, the antitrichomonal agent may be formulated in capsule form using fillers such as lactose, starch or kaolin. A typical capsule would contain 250 mg. of, for instance, 1-methyl-5-nitro-imidazol-2-ylmethyl methyl carbazate, 2–3 g. of magnesium stearate and about 75 mg. of lactose in a No. 0 size capsule. Tablets and capsules containing smaller quantities of active ingredient may be made by reducing proportionately the amounts of excipients and diluents illustrated above. Alternatively, the carbamates may be administered orally in liquid pharmaceutical vehicles such as solutions, emulsions, syrups or suspensions containing the diluents, flavoring agents and preservatives customarily employed in the pharmaceutical art.

For topical application, vaginal creams or suppositories contining the active ingredient may be used. To illustrate, a cream is prepared by mixing sufficient quantities of hydrophilic ointment and water, containing from about 5–10% by weight of carbamate, in sufficient quantities to produce a cream having the desired consistency.

Enterohepatitis is a disease occuring primarily in turkeys and is caused by the protozoan parasite *Histomonas meleagridis*. It is also known as turkey blackhead disease. The imidazolylalkyl carbamates of this invention are useful in the prevention and treatment of this disease and for this purpose are administered to turkeys mixed with an element of turkey sustenance, i.e. in the feed or drinking water. Although the optimum dose level will depend on the particular compound employed and the severity of the infection, good control of enterohepatitis is obtained by orally administering to the turkeys a feed containing from about 0.003% to about 0.1% by weight of carbamate. When the material is administered via the drinking water, somewhat higher levels may be employed, especially for therapeutic use. For instance, the drinking water may contain up to about 0.2% by weight of the active ingredient with good results. Those substances previously mentioned as preferred anti-trichomonal agents are also among those preferred in combating turkey blackhead.

As previously stated, the imidazolylalkyl carbamate described herein may also be employed against trypanosomiasis and amoebiasis. In addition, certain of them, and particularly 1 - methyl - 5 - nitroimidazol-2-yl-methyl carbazate possess activity against the pleuro-pneumonia like organisms which have come to be known as PPLO organisms.

The imidazolylalkyl carbamates are effective against PPLO organisms when the compound is administered to fowl or swine in feed containing from about 0.003% to about 0.1% by weight of carbamate. The preferred dosage level, however, is between from about 0.003% to 0.08% by weight.

The following examples are given for the purpose of illustration and not by way of limitation.

In addition, preparation of the starting materials can be found in U.S. Pat. 3,458,528 or Belgium Pat. 683,796 issued Jan. 9, 1967, an equivalent of the disclosure in U.S. Ser. No. 550,932 filed May 18, 1966, a parent application of the instant application.

EXAMPLE 1

1-methyl-5-nitroimidazol-2-yl-methyl chloroformate 3.12 g. 1-methyl-2-hydroxymethyl-5-nitroimidazole is dissolved in a mixture of 4.3 ml. of dimethylaniline and 20 ml. of dioxane. This solution is then added dropwise to 30 ml. of phosgene. The resulting suspension is stirred for two hours at 0–5° C., and then for two hours at room temperature. The solvent is then removed by blowing dry nitrogen through the suspension for two hours. The oil remaining at the end of this time consists predominantly of 1-methyl-5-nitroimidazol-2-ylmethyl chloroformate.

In accordance with the above procedure, but starting with 1 - methyl - 2 - mercaptomethyl - 5-nitroimidazole, in place of 1 - methyl - 2 - hydroxymethyl - 5-nitroimidazole, there is obtained 1 - methyl - 5-nitroimidazol-2-yl-methyl chlorothioformate.

In accordance with the above procedure and starting with either of the aforementioned nitroimidazoles but using thiophosgene in place of phosgene, there is obtained 1 - methyl-5-nitroimidazol-2-yl-methyl chlorothioformate and 1 - methyl - 5-nitroimidazol-2-yl-methyl chlorodithioformate.

EXAMPLE 2

1-(1'-methyl-5'-nitroimidazol-2'-yl)ethyl carbamate

A solution of 0.01 mole of 1-methyl-2-(1'-hydroxyethyl)-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(1'-methyl-5'-nitroimidazol-2'-yl) ethyl phenyl carbonate is separated by filtration.

A solution of 0.005 mole of 1-(1'-methyl-5'-nitroimidazol-2'-yl)ethyl phenyl carbonate in 10 ml. of chloroform is cooled in an ice-bath, and is saturated with dry ammonia. It is allowed to stand for 5 days at 5° C. 1 - (1' - methyl-5'nitroimidazol-2'-yl) ethyl carbamate, M.P. 156.5–160° C., is obtained as a crystalline precipitate.

EXAMPLE 3

2-(1'-methyl-5'-nitroimidazol-2'-yl)ethyl carbamate

A solution of 0.01 mole of (1-methyl-2'-hydroxyethyl)-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 2-(1'-methyl-5'-nitroimidazol-2'-yl)ethyl phenyl carbonate is separated by filtration.

A solution of 0.005 mole of 2-(1' - methyl-5'-nitroimidazol-2'-yl)ethyl phenyl carbonate in 10 ml. of chloroform is cooled in an ice-bath, and is saturated with dry ammonia. It is allowed to stand for 5 days at 5° C. 2-(1'-methyl-5'-nitroimidazol-2'-yl)ethyl carbamate is obtained as a crystalline precipitate: M.P. 165–166° C.

EXAMPLE 4

1-methyl-5-nitroimidazol-2-ylmethyl carbazate

A mixture of 5 g. of 1-methyl-5-nitroimidazol-2-ylmethyl phenyl carbonate, 0.5 ml. of 95% hydrazine and 25 ml. of chloroform is stirred at room temperature for one hour. At the end of this time the solid is removed by filtration to give 3.8 g. of material; M.P. 101–105° C. This product is dried in vacuo at 68° C. to remove phenol and then recrystallized from water to give substantially pure 1-methyl-5-nitroimidazol-2-ylmethyl carbazate; M.P. 135–140° C.

EXAMPLE 5

1-methyl-5-nitroimidazol-2-ylmethyl carbazate

To a solution of 1-methyl-2-hydroxymethyl-5-nitroimidazole chloroformate in dioxane as prepared in Example 1, there is added dropwise .06 mole of anhydrous hydrazine. The mixture is stirred for 90 minutes with cooling in an ice bath. The mixture is evaporated under reduced pressure, and the residue washed with water and dissolved in ethyl acetate. The ethyl acetate solution after drying over sodium sulfate, is concentrated to yield 1-methyl-5-nitroimidazol-2-ylmethyl carbazate.

EXAMPLE 6

1-methyl-5-nitroimidazol-2-ylmethyl N'-methylcarbazate

.05 mole of 1-methyl-5-nitroimidazol-2-ylmethyl chloroformate is dissolved in 50 ml. of anhydrous tetrahydrofuran and added to a solution containing .15 mole of methylhydrazine in 50 ml. of tetrahydrofuran at 15° C. After 2 hours, the methylhydrazine hydrochloride is removed by filtration. The tetrahydrofuran is removed under reduced pressure and the residue is recrystallized from ethyl acetate to yield 1-methyl-5-nitroimidazol-2-ylmethyl $N^1$-methylcarbazate.

In accordance with the above procedure, but starting with ethylhydrazine, propylhydrazine, or benzylhydrazine, in place of methylhydrazine, there is obtained the corresponding 1-methyl-5-nitroimidazol-2-ylmethyl $N^1$-ethylcarbazate, 1-methyl-5-nitroimidazol-2-ylmethyl $N^1$-propylcarbazate, and 1-methyl-5-nitroimidazol-2-ylmethyl $N^1$-benzylcarbazate.

EXAMPLE 7

1-methyl-5-nitroimidazol-2-ylmethyl $N^2$-isopropylidinylcarbazate 200 mg. of 1-methyl-5-nitroimidazol-2-ylmethyl carbazate is dissolved in 3 ml. of acetone and heated under reflux for 10 minutes. The solvent is removed under reduced pressure and the residue recrystallized from a 1:1 mixture of benzene and hexane to yield 1-methyl-5-nitroimidazol-2-ylmethyl $N^2$-isopropylidenylcarbazate; M.P. 160–162° C.

In accordance with the above procedure, but using methylethyl ketone, benzaldehyde, acetaldehyde, in place of acetone, there is obtained the corresponding 1-methyl-5-nitroimidazol-2-ylmethyl $N^2$-2''-butylidenylcarbazate, 1-methyl-5-nitroimidazol-2-ylmethyl $N^2$-benzylidenylcarbazate, and 1-methyl-5-nitroimidazol-2-ylmethyl $N^2$-ethylidenecarbazate.

EXAMPLE 8

1-methyl-5-nitroimidazol-2-ylmethyl $N^2$-benzoylcarbazate

.1 mole of 1-methyl-5-nitroimidazol-2-ylmethyl carbazate is dissolved in 50 ml. of dry pyridine and cooled in ice. 0.1 mole of benzoyl chloride is added dropwise. After standing for 1 hour at 15° C., the solution is quenched with ice and water. The precipitated 1-methyl-5-nitroimidazol-2-ylmethyl $N^2$-benzoylcarbazate is filtered, washed well with water and recrystallized from ethanol.

In accordance with the above procedure, but using acetic anhydride in place of benzoyl chloride, there is obtained the corresponding 1-methyl-5-nitroimidazol-2-yl methyl $N^2$-acetylcarbazate.

Similarly, but using propionic anhydride, valeric anhydride, butyric anhydride or phenylacetic anhydride, in place of acetic anhydride, there is obtained the corresponding 1-methyl-5-nitroimidazol-2-ylmethyl $N^2$-propionylcarbazate, 1-methyl-5-nitroimidazol-2-ylmethyl $N^2$-valerylcarbazate, 1-methyl-5-nitroimidazol-2-ylmethyl $N^2$-butyrylcarbazate, and 1-methyl-5-nitroimidazol-2-ylmethyl $N^2$-phenylacetylcarbazate.

PREPARATION 1

1-methyl-5-nitroimidazol-2-ylmethyl phenyl carbonate 15.9 ml. dry pyridine and 4.87 g. (0.031 mole) of 1-methyl-2-hydroxymethyl-5-nitroimidazole are added to a flask fitted with a stirrer, thermometer and addition funnel. The mixture is stirred at room temperature until the solid dissolves and then cooled to 0° C. 5.05 g. (0.0322 mole) of phenylchloroformate is added to the stirred solution over an 80 minute period, while maintaining the temperature at 5–10° C. with external cooling. On completion of the addition the reaction mixture is stirred at about 25° C. for 2½ hours. It is then poured into 60 ml. of ice-water with good agitation. The resulting slurry is stirred for 40 minutes and the resulting solid 1-methyl-5-nitroimidazol-2-ylmethyl phenyl carbonate collected by filtration. The solid is washed thoroughly with water and dried in vacuo at 50° C. A yield of 8.24 g. is obtained; M.P. 92–95° C. Recrystallization from 1:3 methanol-hexane gives pure product; M.P. 100–100.5° C.

In accordance with the above procedure, but starting with 1-methyl-2-mercaptomethyl - 5 - nitroimidazole, in place of 1-methyl-2-hydroxymethyl - 5 - nitroimidazole, there is obtained the corresponding 1-methyl-5-nitroimidazol-2-yl-methyl phenyl thiocarbonate.

In accordance with the above procedure, but starting with 1-methyl-2-(1-hydroxyethyl)-5-nitroimidazole, 1-methyl-2-(2-hydroxyethyl)-5-nitroimidazole and 3-(1-methyl-5-nitroimidazol-2-yl)prop-2-en-1-ol in place of 1-methyl-2-hydroxymethyl-5-nitroimidazole, there is obtained the corresponding 1-(1-methyl-5-nitroimidazol-2-yl)-ethylphenyl carbonate, 2-(1-methyl-5-nitroimidazol-2-yl)-ethylphenyl carbonate, and 3-(1-methyl-5-nitroimidazol-2-yl)-prop-2-en-1-yl phenyl carbonate.

PREPARATION 2

1-methyl-5-nitroimidazol-2-ylmethylphenyl thionocarbonate 5.17 g. phenoxythiocarbonyl chloride is added dropwise to a cold solution of 4.71 g. of 1-methyl-2-hydroxymethyl-5-nitroimidazole in 15 ml. of pyridine. During addition the pyridine solution is cooled in an ice bath. After about one-third of the carbonyl chloride is added, 10 ml. of pyridine is added to the reaction mixture. On completion of the addition, the mixture is allowed to warm to room temperature and stirred for three and one-half hours. It is then poured into about an equal volume of an ice-water mixture. A gummy precipitate forms. The water is decanted from this precipitate and the solid triturated with 70 ml. of methanol. Water (70 ml.) is added and the solid product removed by filtration. It is recrystallized from benzene-hexane to give 1-methyl-5-nitroimidazol-2-ylmethyl phenyl thionocarbonate; M.P. 92–98° C. On further recrystallization from benzene-hexane the product melts at 103–105.5° C.

In accordance with the above procedure, but starting with 1-methyl-2-mercaptomethyl-5-nitroimidazole in place of 1-methyl-2-hydroxymethyl-5-nitroimidazole, there is obtained the corresponding 1-methyl-5-nitroimidazol-2-ylmethyl phenyl dithiocarbonate.

What is claimed is:
1. A compound of the formula

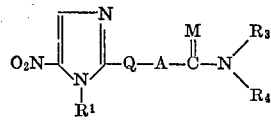

wherein $R_1$ is loweralkyl of 1–5 carbon atoms, Q is loweralkylene or loweralkylidene of 1–4 carbon atoms, A and M are each oxygen or sulfur, $R_3$ is hydrogen, loweralkyl of 1–3 carbon atoms or benzyl, and $R_4$ is amino, loweralkanoylamino, or loweralkylideneamino.

2. A compound of claim 1 in which $R_1$ is methyl.
3. A compound of claim 2 in which Q is methylene.
4. A compound of claim 3 in which both A and M are oxygen.
5. A compound of claim 4 in which $R_3$ is hydrogen.
6. The compound of claim 5 in which $R_4$ is amino.
7. The compound of claim 5 in which $R_4$ is acetylamino.
8. The compound of claim 4 in which $R_3$ is methyl and $R_4$ is amino.

References Cited
UNITED STATES PATENTS

| | | | |
|---|---|---|---|
| 3,299,090 | 1/1967 | Hoff et al. | 260—309 |
| 3,325,507 | 6/1967 | Kollonitsch | 260—309 |
| 3,378,552 | 4/1968 | Henry | 260—309 |

FOREIGN PATENTS

| | | | |
|---|---|---|---|
| 683,796 | 1/1967 | Belgium | 260—309 |

NATALIE TROUSOF, Primary Examiner